United States Patent
Bureau et al.

(10) Patent No.: US 7,119,030 B2
(45) Date of Patent: Oct. 10, 2006

(54) PROCESS FOR LINING A SURFACE USING AN ORGANIC FILM

(75) Inventors: Christophe Bureau, Suresnes (FR); Guy Deniau, Auffargis (FR); Serge Palacin, Montigny le Bretonneux (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/523,641

(22) PCT Filed: Aug. 25, 2003

(86) PCT No.: PCT/FR03/50035

§ 371 (c)(1),
(2), (4) Date: Nov. 17, 2005

(87) PCT Pub. No.: WO2004/018573

PCT Pub. Date: Mar. 4, 2004

(65) Prior Publication Data

US 2006/0110929 A1    May 25, 2006

(30) Foreign Application Priority Data

Aug. 26, 2002  (FR) .................................. 02 10568

(51) Int. Cl.
*H01L 21/469*  (2006.01)
*H01L 21/31*   (2006.01)

(52) U.S. Cl. ................. 438/758; 438/510; 438/613; 438/22; 438/29; 29/852; 29/830; 29/831; 257/E21.166

(58) Field of Classification Search ........... 438/758, 438/510, 613, 22, 29; 29/852, 830–831

See application file for complete search history.

(56) References Cited

U.S. PATENT DOCUMENTS

| 5,527,434 A | 6/1996 | Hamnett et al. |
| 5,961,810 A | 10/1999 | Li et al. |

FOREIGN PATENT DOCUMENTS

| EP | 1227135 | 1/2001 |
| FR | 2798146 | 3/2001 |

OTHER PUBLICATIONS

Database WPI, XP002240289, Dewert Publications Ltd., London, GB AN 1993-113134.

*Primary Examiner*—Michael Lebentritt
*Assistant Examiner*—Mohsen Ahmadi
(74) *Attorney, Agent, or Firm*—McKenna Long & Aldridge LLP

(57) ABSTRACT

The present invention relates to a method for cladding a simple or complex surface, electrically conducting or semi-conducting, by means of an organic film from at least one precursor of said organic film, characterized in that the cladding of the surface by the organic film is carried out by electro-initiated grafting of said, at least one, precursor of said surface by applying at least one potential sweep on this surface carried out in such a way that at any point of said surface the maximum potential of each potential sweep, in absolute value and relative to a reference electrode, is greater than or equal to the value of the potential ($v_{bloc}$) from which the curves of a graph expressing the quantity of electro-grafted precursor on a surface identical to said surface in function of the number of potential sweeps are all superposed and independent of this $v_{bloc}$ potential.

16 Claims, 6 Drawing Sheets

PROCESS FOR LINING A SURFACE USING AN ORGANIC FILM

This application is a national phase application of PCT Application No. PCT/FR2003/050035 filed Aug. 25, 2003, which claims the benefit of French Patent Application No. 0210568, filed Aug. 26, 2002, which are both hereby incorporated by reference.

TECHNICAL FIELD

The present invention relates to the field of organic surface coatings, the said coatings being in the form of organic films. In particular, it is related to a process for making a lining on a surface by an electrically initiated reaction using an organic film with a uniform thickness, even at a scale less than or equal to 1 micrometer, on a conducting or semiconducting surface.

In many applications, it is important to obtain organic linings or coatings with a uniform thickness, particularly at a scale less than 1 micrometer, and in particular when this coating acts as a protective coating, for example an anti-corrosion, biocompatible coating, etc., or as an electrically insulating or conducting coating, an optical absorbing coating, a coating on biochips or chemical sensors, etc., in which the properties resulting from this coating are almost directly related to its thickness. Any local non-uniformity in the thickness is then the cause of a local defect in the required performance.

PRIOR ART

Processes are known for deposition of organic linings that can operate on almost all types of surfaces, and therefore particularly on electrically conducting and semiconducting surfaces. For example, there are physical and chemical vapour phase deposition (CVD, PVD, etc.) processes, and centrifuging and spin-coating processes.

However, PVD and CVD depend on the existence of suitable precursors to obtain the reactive vapour necessary to make the deposit. Therefore, only some types of coatings are possible, which makes it difficult to optimise functions to be performed by the coating. Furthermore, particularly in microelectronics, it is found that PVD is sensitive to the three-dimensional topology of the surface and particularly to point effects, particularly on structures with large depth to width aspect ratios. This sensitivity is probably the result of the greater reactivity of areas with geometric projections and causes more marked thickness non-uniformities if the structures are thin (<0.13 μm).

Thickness non-uniformities of films are also observed when the PVD or the CVD have to be used in combination with a masking device, resulting from mask edge effects. Finally, the thickness check of organic depositions by CVD is now insufficient for ultra-thin coatings in the industrial domain, particularly for thicknesses of less than a few microns, which makes this range of thicknesses even more inaccessible.

Edge effects are also observed for deposition by centrifuging ("spin coating"). This process enables good uniformity of thicknesses as long as the liquid flow deposited under the effect of the centrifugal force remains laminar. In general, this is not the case on the edges of surfaces nor vertically in line with rough paving that causes flow turbulence ("Eckman spirals"). Furthermore, for ultra-thin films, it has been observed that evaporation of the solvent during application of the process increases the viscosity of the fluid (often locally non-uniformly) and causes thickness non-uniformities. Furthermore, devices making use of these processes are complex since they require a control over saturating vapour pressures, the temperature and even the humidity.

Solvent annealing processes for organic coatings deposited by "spin-coating" have been developed to overcome the above-mentioned disadvantages. However, they require an additional step with a significant cost.

Other processes based on electrochemistry have been developed to obtain organic coatings with an adjustable thickness. Unlike previous processes, these processes directly use the electrical properties of conducting and semiconducting surfaces and are only applicable on these surfaces. For example, it has been known for many years that polymers with fillers on electrically conducting or semiconducting surfaces can be electrically deposited. For example, it is also known how to do electroplating of metals, or electro-polymerisation of conducting polymer precursor monomers such as pyrrole, aniline, thiophene, EDOT, etc. What these reactions have in common is that they are electrically driven reactions, in other words they do not continue unless there is an electrical current passing in the electrical circuit in which the surface to be treated is one of the electrodes. A distinction should be made between these reactions and electrically initiated reactions, in which only one step (the initial step) is electrochemical, and generates a coupled chemistry independent of the current.

However, these processes have two significant handicaps that significantly reduce their use in microelectronics, and more generally in the manufacture of organic coatings on surfaces made from semiconducting materials:

Progress of electrically driven reactions depends on the electrical potential and/or the current being maintained in the electrolysis cell throughout the film growth period. Therefore the resulting coating thickness depends on the integral current charge that passed through the circuit.

These electrically driven reactions are insufficient to achieve film thickness uniformities within a few tens of nanometers on surface areas of several square centimetres, for example as is the case frequently in microelectronics. If two electrically conducting or semiconducting areas are electrically connected in series through an impedance, then not all of the electrical potential applied to one will be transmitted identically to the other, despite the connection between the two surfaces; there is a resistive drop between the two areas. This resistive drop implies that the apparent potentials applied to the two surfaces are different, and therefore that the electrical currents that pass through them are different, for equal areas. For equal electrolysis times, the charges that passed through each area will be different, and the film thicknesses obtained using an electrically driven reaction will also be different.

In summary, electrically driven reactions result in coatings that are above all faithful to the topology of resistive drops—related to the process and the device for implementing it—and not to the geometric topology of the initial surface.

Furthermore, no process based on electrically driven reactions is used at the present time to obtain organic coatings when it is important to be able to achieve uniform thicknesses to within a few tens of nanometers on surface areas of a few square centimetres, for example as is the case in microelectronics.

Considering the current difficulty in making surfaces with no non-uniformity in the surface resistance, and perfect electrochemical cells without any non-uniform current distribution, there is a real need to have organic film deposition processes that level the effects of a resistive drop between one point and another on a given surface.

This need is particularly important in all application fields in which semiconducting materials are used, for example in micro-electronics, in microsystems such as sensors, micromachines, etc., since these materials are precisely characterised by the fact that their surface is not equipotential, and that there is always a resistive drop between any two different points on this surface.

Thus, it is found that the efficiency of processes now available to make the deposition of an organic coating on a conducting or semiconducting surface with good control over the thickness, are closely related to the surface topography, for example to the roughness for non-electrochemical processes and to the topography of resistive losses for electrochemical processes.

PRESENTATION OF THE INVENTION

The present invention provides a solution to the various problems in prior art mentioned above, by providing a process capable of quickly and reproducibly obtaining organic films with a uniform thickness, even for film thicknesses of less than 1 μm, on an arbitrarily-shaped support surface, and therefore in particular regardless of its topography.

The process used for the present invention is a process for lining a simple or complex, electrically conducting or semiconducting surface, using an organic film, starting from at least one precursor of the said organic film, characterised in that the surface is lined by the organic film by electrically initiated grafting of the said at least one precursor on the said surface by application on this surface of at least one potential scan made such that, at all points on the said surface, the absolute value of the maximum potential of each potential scan with respect to a reference electrode is greater than or equal to the minimum scanning potential value ($V_{block}$), and the curves in a graph expressing the quantity of precursor electrically grafted on a surface identical to the said surface as a function of the number of potential scans are all superposed on this minimum scanning potential value $V_{block}$ and are independent of it.

Various measurements such as the real quantity in mol/$cm^2$ (concentration per unit area) or the thickness of the resulting organic film (for a maximum grafting rate) can be used to evaluate the quantity of the electrically grafted precursor. Depending on the case, some of these measurements will be easier to carry out than others, depending on the chemical nature of the precursors and the organic films finally obtained, and it would be good to choose the easiest, for example the thickness measurement using profilometric method, ellipsometry, atomic strength microscopy or tunnel effect microscopy.

According to one particular embodiment of this invention, the organic film may be an organic polymer film and the monomer may be an electro-active precursor monomer of the said organic polymer film. In this particular embodiment, the electrically initiated reaction is then obviously an electrically initiated polymerisation of the said at least one precursor monomer. In this embodiment, the graph may be a graph expressing the thickness of the said organic polymer film as a function of the number of potential scans.

In general, electrically initiated grafting reactions of this invention, hereinafter referred to as electrically initiated reactions, shall be considered separately from electrically driven reactions that are electrochemically initiated reactions but for which progress cannot continue unless the electrical potential and/or the current is maintained in the electrolysis cell. In other words, they are electrochemical reactions generating coupled chemistry containing at least one electrochemical reaction. As described above, the thickness of the coating obtained by the electrically driven reaction depends on the integral charge of the current that passed through the circuit, and therefore the local resistive drop.

The process according to this invention does not depend on these parameters. In fact, only the electro-initiation step, also called the electro-priming step, depends on the electrical current. In particular, this initiation depends on electro-activation of the precursor of the organic film, for example leading to the formation of species that have been oxidised or reduced starting from the precursor(s), and are therefore subsequently only the source of molecular or macro-molecular species without any significant electro-activity in the electrode potential ranges used.

For example, polymer films grafted using the particular embodiment of the process according to this invention obtained by grafting of electrically activated monomers on conducting or semiconducting surfaces, are obtained by electro-initiation of the polymerisation reaction starting from the surface followed by growth of the chains, monomer by monomer. Grafted chains are allowed to grow by purely chemical polymerisation, in other words independently of polarisation of the conducting surface from which grafting was done. Therefore, it is quite clear that the potential protocol plays a distinct role from the composition of the solution. Once growth of the chains has begun, growth of the film is managed by the composition of the solution: all chains will be the same length since the solution facing the surface is the same for all growing chains. Therefore, the thickness of the organic film grafted on the surface is adjusted by adjusting the grafting ratio on the surface, and this thickness is the same everywhere when this grafting ratio is maximum.

Therefore according to the invention, if a series of coatings is made on successive surface areas that are all strictly identical, and if identical appropriate operating conditions are imposed on each surface, a maximum grafting ratio can be achieved every time on every surface by using potentials greater than $V_{block}$, the surface thicknesses can be changed on different surfaces simply by changing the composition of the solution.

The process according to the invention can include reactions based on competition to terminate the growth of chains: these reactions interrupt the growth of chains and therefore contribute to fixing the maximum thickness of the film when the chains are in brush form using the process according to the invention. The radicalar inhibitors and active site transfer agents in radicalar polymerisation reactions (particularly members of redox couples), protons (and by extension protic molecules) and electrophiles and particularly cations, nuleophiles and particularly anions, are candidate compounds for acting as a termination agent for electrically initiated reactions for this invention in order to adjust the thickness control if necessary.

The electrically initiated reactions that could be used in the process according to this invention as claimed are reactions in which the electro-initiation can correspond to a reduction of a monomer, or an oxidation of a monomer using an electrical current or in which the electrically reduced monomer is the initiator of anionic polymerisation reactions, or it can correspond to cationic polymerisation reactions when the electro-initiation applies to oxidation of a monomer, on the surface and in solution. It may also consist of reactions initiated using an electro-active mediator; once oxidised or reduced, this activated mediator acts as a usually radicalar polymerisation initiator. Candidate mediators include diazonium, phosphonium, sulfonium, iodonium salts, peroxodisulfates, sulfamates, metallic ions and complexes of them, etc.

According to the particular embodiment of this invention described above, the at least one electrically activatable precursor monomer of the organic film could for example be a vinyl monomer. In the case of a vinyl monomer, it may advantageously be chosen from the group formed from vinyl monomers such as acrylonitrile, methacrylonitrile, methyl methacrylate, ethyl methacrylate, butyl methacrylate, propyl methacrylate, hydroxyethyl methacrylate, hydroxypropyl methacrylate, glycidyl methacrylate, acrylamides and particularly amino-ethyl, propyl, butyl, pentyl and hexyl methacrylamides, cyanoacrylates, di-methacrylate glycol polyethylene, acrylic acid, methacrylic acid, styrene, parachlorostyrene, N-vinyl pyrrolidone, 4-vinyl pyridine, vinyl halides, acryloyl chloride, methacryloyl chloride and derivatives of them.

Analogues of these vinyl monomers obtained by coupling or modification to one of these monomers with any molecule or macromolecule can also be used. This molecule or macromolecule may for example be chosen from the group composed of a polymer such as glycol polyethylene; a nitrogen base, for example such as adenosine or its derivatives, for example such as 3-deaza adenosine; or a trace nucleotide, for example such as a probe sequence used on a DNA chip; a peptide, for example such as a prion; a protein such as an enzyme, an anti-body, etc.; a fatty acid such as linoleic acid; a glucide, for example such as glucose; a polysaccharide that may or may not be modified such as dextrane and modified dextranes; cellulose and its derivatives; chitosane and its derivatives; etc. In this case, the precursor is a vinyl monomer coupled to this molecule or macromolecule.

Depending on the nature of the reaction that allowed the coupling, it may also conversely consist of molecules or macromolecules carrying several activated vinyl groups, and particularly those mentioned in the above list.

When several precursor monomers are used in the process according to this invention, it may consist of a mix of several vinyl monomers for example chosen from among the above mentioned vinyl monomers. In general, it may consist of polymers, the growth of which was initiated by an electro-active initiator with ionic reduction or oxidation products. In the case in which a mediator was used, the growth of the polymers used is initiated by the electro-active mediator, with radicalar reduction or oxidation products.

The process according to this invention may also use electro-grafting reactions of cyclic monomers such as epoxides, lactones, for example □-caprolactone, etc. that are cleavable by nucleophilic or electrophilic attack. The principle of these reactions is the same as for vinyl monomers, except that the polymer film growth takes place by opening cycles.

Electro-grafting reactions of diazonium, sulfonium, phosphonium, iodonium, ammonium salts, alcohols, thiols, etc., can also be used in the process according to this invention. These are molecules that when reduced produce radicals that are self-adsorbed (chemical absorption) directly onto the surface and do not create any growth (passivation). For example, this is the case of processes used to make very small thicknesses close to a molecular monolayer since there is no growth of polymer type chains. The blocking phenomenon mentioned in this description is not the phenomenon that would block growth of a species that would eventually hinder the growth of other chains formed later, but is directly the phenomenon of metallic sites through which the current can pass.

The process according to this invention can also use electro-polymerisation reactions initiated for example by peracids, thiolates, diazonium, sulfonium, phosphonium, iodonium salts or other compounds for which the reduction or oxidation product is a polymerisation primer radical in the presence of monomers that can be polymerised by radicalar methods such as vinyl polymers like those mentioned above, for example acrylonitrile, etc.

Processes according to which polymers are obtained tonically can also be used, for example activated vinyl polymers, cyclic molecules cleavable by nucleophilic or electrophilic attack initiated by anion or cation radicals of compounds such as naphthalenes, metallic salts and other compounds for which the anion or cation radical is a polymerisation primer.

A simple surface according to the meaning of this invention means a single piece surface without any roughness, usually with a smooth surface or a surface with a controlled roughness, particularly at the scale of the thickness to be achieved. A complex surface according to the meaning of this invention means a surface composed of different parts that can be distinguished or are distinct as a result of their composition and/or their shape, connected to each other by conducting or semiconducting links or structured or unstructured surfaces with depressed, etched or embossed parts, or glued parts or several of these parts, and surfaces located on different parts of the support that are or are not connected, on which the film must be grafted using the process according to this invention.

The process according to this invention enables genuinely fine control of the uniformity of the thickness of the organic film or coating deposited by electrically initiated reactions enabling the production of uniform, ultra-thin organic linings or coatings less than 1 μm thick, in other words at scales that are very difficult to achieve industrially using processes according to prior art mentioned above on simple or complex surfaces.

Unexpectedly, the absolute value of the maximum potential of each potential scan with respect to a reference electrode, greater than or equal to the minimum potential value $V_{block}$ using the process according to this invention gives almost maximum occupancy, usually more than 50% of the conducting or semiconducting surface by the at least one electrically grafted monomer even in a first potential scan, and more than 80% or even 90% after only a few scans. The inventors of this invention have observed that unexpectedly, two to five potential scans according to this invention are usually enough to achieve maximum occupancy of the surface. This maximum occupancy situation is called the <<blocking>> situation. Growth of the grafted chains starting from electrically grafted monomers on the surface takes place by purely chemical polymerisation, in other words independently of the polarisation of the conducting surface that caused grafting. Since occupancy is maximum, the polymer chains are densely grafted onto the support since they are almost upright on the surface and form a "brush". The consequence is that the film thickness is similar to the length of the extended chains, self-regulated and uniform.

Therefore, the inventors of this invention were the first to have made organic polymer films with a uniform thickness even at molecular scale, using the process according to this invention.

Obviously, the number of potential scans to obtain maximum surface occupancy depends on operating conditions, the type of surface and the type of electrodeposited organic polymer film. For example, it may be N, where N is a positive integer number, and $1 \leq N \leq 15$. This example is not limitative, but in general it is sufficient to obtain a quasi-maximum or maximum occupancy of the surface by the precursor monomer(s).

Obviously, the graph showing the quantity of electrically grafted precursors as a function of the number of scans according to this invention is preferably determined under the same operational physicochemical conditions as will be used for electro-grafting using the process according to the invention.

By way of illustration, according to one particular embodiment of the present invention, the monomer(s) and the solvent(s) required for electro-grafting a polymer film according to the method of the invention will be the same as those utilized for determining the $V_{bloc}$ by means of the graphic. In this case, determination of $V_{bloc}$ is realized by a graphic giving the thickness of the organic polymer film as a function of the number of scans under the same physio-chemical operational conditions as that used for the electro-initiated grafting according to the method of the invention.

According to the present invention, scanning of potentials can be a continuous or discontinuous, sinus or in segments. For example, it can be a scan under voltammetric conditions or polarization by multiple segments. Polarization by multiple segment makes it possible to make a supplementarily adjustment of the relationship between the polarization time relative to the idle time, even if it is generally observed that it is possible to obtain a result similar to that under voltammetric condtions using a lower number of scans.

The method of the present invention makes it also possible to achieve a maximum occupation rate of the surface, whether it is simple or complex, by the precursor; for example, the monomer precursor of an organic polymer film, in virtue of the application of this scan of potentials at every point of said surface conforming to the method of the present invention.

The present inventors are thus the very first to resolve these technical problems of the prior art connected with the effects of ohmic drops due to non-homogeneities in surface resistance by evening out the effects between one surface point and another, whether simple or complex, in the context of the present invention, in virtue of the method of the present invention.

The method of the present invention finds very interesting application in particular for the following surfaces:

Surfaces of perfectly controlled texture but comprised of or comprising semi-conductor materials and the area is very large in advance of the texture or the patterns that have been engineered. This is the case, for example, of the wafers of silicon, for example, in microelectronics, in manufacturing coatings for the copper interconnection. In this application, it is necessary to produce deposit material having low dielectric permittivity ("low k dielectrics"), low thickness, in general less than 500 nm, having a thickness control in the order of several tens, that is a decade of nanometers on disks of 200 or 300 millimeters in diameter. Any electrochemical desposit presumes placement of an electrical contact. Frequently, this electrical contact is realized on the periphery of the wafer and there is an ohmic drop between the peripheral electrical contact and the center of the wafer. The method of the present invention also make it possible to obtain an organic film of uniform thickness, even at thicknesses of less than μm on this type of surface.

The surfaces of the doped semi-conductor materials can have doping inhomogeneities that can result in different ohmic drops between the current carrying contact and different points of the surface. This can be, for example, the case of wafers, for example, of silicon having doping zones and supplied electrically either in the periphery (corona), on on the back surface; in other words, for example, by means of a contact where the back fact of the wafer has been metallized, wholly or in part. The method of the present invention also makes it possible to obtain an organic film of uniform thickness, even at thicknesses of less than μm on this type of surface. The surfaces of the doped semi-conductor materials can have doping inhomogeneities that can result in different ohmic drops between the current carrying contact and different points of the surface. This can be, for example, the case of wafers, for example, of silicon having doping zones and supplied electrically either in the periphery (corona), on the back surface; in other words, for example, by means of a contact where the back fact of the wafer has been metallized, wholly or in part. The method of the present invention also makes it possible to obtain an organic film of uniform thickness, even at thicknesses of less than μm on this type of surface. The surfaces of the conductors or the semi-conductors on which the etchings have been made. When it is attempted to carry out deposits by electrolytic means of the prior art; in other words, by an electro-tracking reaction over such surfaces; the counter-electrode is generally a planar surface, which does not have—more or less—a structure as complex as the surface itself. When the surface of the object is placed facing the counter-electrode, the object/counter-electrode distance varied from one point to another from the object, which results in some points not having the same ohmic drop, because they do not experience the same volume of electrolytic solution between the two electrodes and thus, they are not brought to exactly the same potential. This is the case, for example, of etched wafers that can have wide etchings of several hundreds of nanometers, for which it is necessary to provide organic coatings that conform as much as possible to the topology of the etching. The attempt was made in the prior art to minimize this ohmic drop effect by using—for example, for the metal deposit—solutions of elevated ionic strength. However, the recipe was only partially sufficing on the microelectronic scale and it was generally necessary to complexity at some time the topology of the counter-electrode in order to perfect the homogenization of the lines of current arriving on the surface to be treated. The method of the present invention makes it possible to overcome these drawbacks of the prior art and to obtain an organic film of uniform thickness, even at thicknesses of less than μm also in this type of surface.

The etched conducting or semi-conducting surfaces and whose etchings have locally projecting geometries. These zones are the source of "point effect" that concentrate the field lines and are thus the source of a very local variation of the apparent ohmic drop. Most often, this variation is the source of a local increase in current, which has the effect of locally augmenting the quantity of material deposited (bosses) and thus of impairing conformity of the coating by the homogeneity of the thickness. The method of the present invention also makes it possible to obtain an organic film of uniform thickness, even at thicknesses of less than μm on this type of surface.

The present invention is applicable, for example, in any method of organic functionalization of a surface; that is to say, in any method that comprises equipping a surface with a substrate or with a support by an organic film.

It is applicable, for example, in the field of Microsystems in general, such as detectors, micro-machines, etc., in which it is necessary, especially for reasons of costs, to collectively functionalize printed circuits, when they are still on their original wafer-type support, by depositing organic layers for lithography for a coating (chip scale package) etc., or for any other organic functionalization of the surface, for example for adhesion for the polymer flip-chip, electrical insulation, anti-adhesion of biological molecules, etc.

It also finds application in the realization of an insulating layer or a barrier layer in the Microsystems, such as the aforementioned, for example, in microelectronics.

The thicknesses of the organic layers to be deposited in the different applications of the present invention can be of several hundreds of nanometers to several microns or tens of microns for a waver surface, whose general dimensions are 200 or 300 millimeters.

The present invention also finds application in manufacturing biochips, for example, in the prior methods for collectively addressing molecules such as biomolecules, for example. In fact, for example, on protruding (flip-chip) sensor supports (wafer), distant component elements, for example, gold spots, must sometimes be covered with organic coatings of identical thicknesses in order to make possible assembly of a second component without subsidence. The method of the present invention makes it possible to provide organic film polymers forming such organic coatings and making possible assemblies of a second component without subsidence.

The present invention finds application also in microelectronics where the surfacing can be reduced to a single zone that covers the totality of the wafer. The thicknesses can then be of the order of a hundred nanometers or less, with a control that must be of several % on the scale of an object of 200 to 300 millimeters in diameter. The method of the present invention makes possible such a control.

The present invention also finds a plethora of applications in the field of optics, where the uniformity of the deposit is directly linked to the performances of the macroscopic object. The specialist in the field knows well, for example, that in the field of biochips for fluorescent detection and, more generally, by optical detection (generation of a sum frequency, generation of second harmonic, etc.), the thickness of the organic coating that serves primarily in capturing labeled oligonucleotides sequences is critical in the extinction of the fluorescent signal characterizing the diagnosis of hybridization: whatever the nature of this coating, the physics of the phenomenon demands thicknesses in the order of several tens of nanometers with a precision in the order of 10 to 20%, for example 60 (10 nanometers for a Cy3 type fluorophore), 80 (10 nanometers for a type CY5 type fluorophore label) for optimizing the signal to noise ratio. The same studies demonstrate an almost total extinction of the fluorescence signal if the thickness of the oligonucleotide fixation coating approaches a hundred nanometers. Miniaturization of the biochip supports is currently in development but the spots of these supports have still dimensions characteristically greater than several tens or several hundreds of microns. The present invention makes it possible to obtain the film thicknesses required in these fields of optics. It thus makes it possible to optimize the performances for novel generations of miniaturized biochips.

The same physics leads obviously to the same constraints in the field of optics in general, of optoelectronics and photovoltaics. The present invention also responds to this type of constraint.

In addition, the present invention is applicable in the optical perfection of fashion accessories, where the surface aspects are associated with thicknesses in the order of visible wavelengths, but low relative to the shape of the object.

Other features and advantages will become apparent to the specialist in the art on reading the description and the following examples given illustratively but non-limitingly with reference to the appended drawings.

DETAILED DESCRIPTION OF THE INVENTION

The method of the present invention resides in the grafting and the growth of organic films by means of electro-initiated polymerization reactions. These are electrochemical reactions, one of whose products at least is absorbed by physiosorption or chemisorption on the surface, this product can itself be implicated in a chemistry coupled with the transfer of charge and, in particular, a chemistry that induces the growth of the organic film on the surface where the electro-initiation occurred.

The particularity of this coupled chemistry is that its kinetics and/or its thermodynamics are not correlated to the electrical current that accompanies the electro-initiation. These are chemical reactions and autonomous; in other words, non-electrochemical, whose parameters of advancement or interruption can be linked, for example, to the concentration of the electro-activated species, to temperature, to the nature of the solvent, or even to the presence of a particular additive in the solution, but where the electrical current remains a parameter that does not intervene directly in the thickness of the coating or the organic film finally obtained.

Appended FIGS. 1$a$) and $b$) represent the electrochemical reaction mechanisms used in an illustrative exemplary embodiment of the method of the present invention, when the precursor monomer of the organic polymer is acrylonitrile. Electro-grafting is done under cathodic polarization, the growth of the grafted chains is done by anionic polymerization.

The measured electrical current corresponds to manufacture of the anion radical adsorbe on the surface (S) by electronic transfer in FIG. 1$a$). As this reaction diagram shows, only part of the radical anions thus created are going to have a sufficient life-span to be the initiators of a polymerization reaction. The other part of these radicals is going to desorb in order to produce polymer in solution, thus liberating metal sites on which other monomers are going to be capable of being adsorbed in order to be reduced in their turn (FIG. 1$b$).

This teaches the absence of direct correlation that can exist between the voltammetric current and obtaining the grafting in the method of the present invention.

Generally, the voltammetric current diminishes on each scan, which corresponds to an increasingly progessive occupation of the metal sites of the surface (S) by grafted polymer chains. This current ends by canceling itself almost completely for a sufficient number of scans when the rate of occupation of the sites of the initial surface is such that there is no longer sufficient space available for the growth of a new chain. In this case, any residual current that can be present, even if it is ordinarily very weak, corresponds largely to the step of FIG. 1$b$) of the reaction diagram: grafting, inasmuch as it attains its maturity; that is, the maximal rate of chains per unit of surface has been reached.

It is now important to examine what occurs with the chains of growing grafted polymer: in the step of FIG. 1$a$)

of the reaction diagram, it is found that growth of the chains is identical at all points at which it develops in any anionic polymerization, that it may otherwise be electro-initiated or not.

This growth is essentially guided by the concentration of monomer as well as of polymerization inhibitors. The short length of the chains obtained by electo-grafting suggests that there is a certain impairment between the adjacent growth extremities and that the kinietics of propagation is probably less than that which could be observed due to initiation in solution. Whatever it may be, and even if the detailed mechanism linked to the growth of the grafted polymer chains is not completely elucidated, it can be captured diagrammatically that the lengths of the electro-grafted chains is not linked to the stage of electro-grafting itself: each grafted monomer occasioning at the start of the chain consumed one electron and one alone and the electrochemical protocol no longer had control of the propagation reaction. An essential consequence of the method of the present invention is that it is thus possible to regulate the thickness with sufficient precision by producing a more or less elevated rate of occupation of the sites: when the chains are "thinly" grafted on the support; they have the tendency to lie on the surface, the measured thickness of the film obtained is thin and probably not uniform, at least at the molecular level.

When the polymer chains are densely grafted on the support; in other words under conditions of scanning of potential according to the method of the present invention, that are almost erect on the surface and form a "brush" and the thickness of the film is close to the length of the extended chains.

Thus, for an electrolytic solution of a given composition, the higher the rate of coverage of the surface that conditions the thickness obtained according to the method of the present invention and not the growth of the chains themselves. Now, as has been described hereinbefore, the rate of coverage can be gradually increased up to a limit level, where the growths of chains are prevented by excessive loading on the surface. As this coverage rate conditions the thickness, the thickness of the electro-grafted coatings according to the method of the present invention is rather "autoregulated".

The method of the present invention utilizes a monomer precursor of the organic polymer. Once activated, that is reduced or oxidized, this monomer becomes the source of a chemistry leading to the production of molecules or macromolecules that themselves impair the production of their kind, up to the point of blocking the entire process. Once the process is blocked, the electro-active monomer may continue to be reduced or oxidized, but the chemistry coupled to the transfer of charge is limited to the formation of soluble species or no longer induce the modifications of the first molecular layer of the precursor monomer fixed on the surface of the support, and the characteristics of the film or coating, for example its thickness, stabilize. This mechanism is very probably at the source of the autoregulation of the thickness of the film that is observed by using the method of the present invention.

In practice, it is necessary to examine the operational conditions by which the higher end of the coverage rate of the surfaces is reached; that is, the situation of blockage and autoregulaton mentioned above and to what degree it can be expected with a certain tolerance regarding the ohmic drops; in other words over a range of potentials.

Determination of the potential $V_{bloc}$; that is, the minimal level of potential used as the stop potential under voltammetric conditions or as the plateau potential in polarization by multiple segment for grafting and growth of a given organic polymer film according to them method of the present invention is realized using plotting of a graph giving the thickness of the electro-grafted organic polymer film as a function of the number of scans.

The appended FIG. 5 represents one such graph. In this figure, Tr (%) represents the percentage of transmission at the wavelength of absorption of the vibrator of the CN nitrile bonds of the electrografted film (measured on infrared reflection spectroscopy, IRRAS) and N represents the number of scans. The nomogram of FIG. 4 shows that this % of transmission is connected with the thickness of the electro-grafted film, measured independently by profilometry.

In this figure, $V_{bloc}$ is the level of potential form which the curves producing the thickness of the electro-grafted film as a function of the number of scans are all superimposed.

In this example, in which the monomer precursor is methacrylonitrile, $V_{bloc}$ is from −2.3 to −2.5 V (AG$^+$/Ag), preferably around −2.4 V/(Ag$^+$/Ag).

Electro-grafting according to the present invention can be tracked by means of a typical voltammogram for the electro-grafting reactions as represented in the appended FIG. 2. This figure represents the current (in mA) as a function of potential (−E) at which the surface is exposed, this potential being marked relative to a silver reference electrode. The horizontal arrows indicate the potential scans. V represents the potential at a time t, during scans.

This votammogramme is characterized by the following critical potentials:

For $V<V_s$, "$V_s$" being the threshold potential, there is almost no electrical current. The system is quasi-stationary from the point of view of electronic exchanges and the surface remains unchanged.

For $V_s<V<V_g$, "$V_g$" being the potential starting at which grafting on the surface of the monomer precursor appears, the current is due essentially to the mechanism of the appended FIG. 1b) and no electro-grafted film is observed.

For $V_g<V<V_{bloc}$, "$V_{bloc}$" being the potential of blockage, part of the current is to the electro-grafted film, and part is used in the formation of a polymer in solution. This corresponds to the diagram of FIG. 1a). The blockage potential is rather delicate to precisely define, but it can be considered that it is greater than the peak potential, $V_{pic}$. It is when the potential is situated in this zone that grafting and thus augmentation of the coverage rate of the surface, occurs. For example, voltammetric scans can be carried out between an initial potential "$V_i$" and a final potential "$V_{fin}$". It is when $V_{fin}>V_{bloc}$ that the repeated scans make it possible to reach the blockage process according to the present invention. In another embodiment of the process of the present invention, the same result can be obtained with multiple-sectors of potential.

For $V>V_{bloc}$, the electrical current is limited either by diffusion or by the reaction of polymerization in solution. In general fashion, sensitive modification of the thickness of the film obtained in this zone of potential is no longer observed—beyond a minimal number of scans—because the blockage of the grafting reaction has occurred.

In FIG. 6, it is observed that whatever the stoppage potential $V_{fin}$, the thickness of the film electro-grafting is marked out as a function of the number of scans: The curves giving the thickness as a function of the number of scans having an asymptote, that permits estimating the limit thickness that can be attained by using an end potential $V_{fin}$ given as a synthesis parameter.

FIG. 6 represents the % of transmittance of the nitrile label corresponding to these limit thicknesses as a function of the end potential $V_{fin}$ of the voltammetric scans utilized according to the data of FIG. 5. It is observed that there is a cathodic potential, $V_{bloc}$, beyond which the thickness of the electro-grafted film is independent of the potential $V_{fin}$ utilized: this observation serves to define the blockage potential, $V_{bloc}$.

Thus, according to the present invention, a succession of voltammetric scans with a "flat" final potential $V_{fin}$, for example under the effect of a parasitic ohmic drop or due to a complex surface, will not have an influence on the quality of the grafted organic film, n particular on its surface, such that the effective $V_{fin}$ potential will be greater than $V_{bloc}$ everywhere on the surface on which the film must be grafted.

Thus, when the electro-grafting by voltammetric scanning is done according to the method of the present invention, for example, using an initial potential of −0.7 V ($Ag^+$/Ag) at a scanning speed of 100 mV/s on a gold surface of a 1.5 mol/l solution of methacrylonitrile in the dimethyl formamide (DMF) in the presence of $10^{-2}$ mol/l of perchlorate of tetraethyl ammonium (TEAP): one has $V_s$ (−1.6 V/($Ag^+$/Ag), $V_{pic}$=−2.25 V/($Ag^+$/Ag), $V_g$ (−2.2 V/($Ag^+$/Ag), $V_{bloc}$ (−2.3 V/($Ag^+$/Ag). The currents observed are in the order of milliamperes.

According to the method of the present invention, the maximal potential of each potential scan must, in consequence, be attained, at minimum, at every point of the surface on which the polymer film is grafted in order to obtain a uniform film thickness.

We shall consider a first and a second gold surface connected electrically in series but separated by a 100 kΩ resistor, one of which is connected to a potentiostat. It is a complex surface in the context of the present invention. For currents of the order of the milliampere, the ohmic drop between the two gold surfaces is on the order of 100 mV. Thus, if the first surface connected to the potentiostat is, for example, polarized up to −2.35 V/($Ag^+$/Ag) or if, under voltammetric conditions, the final potential of the scan is $V_{fin}$=−2.35 V/($Ag^+$/Ag), the second surface, connected to the first, will be only a potential of approximately −2.25 V/($Ag^+$/Ag) or very close to the grafting potential $V_g$. Even if after several scans, the inventors observed an electro-grafted film less thick over the first surface directly connected to the potentiostat than on the second surface.

If the first surface connected to the potentiostat is brought to a potential of −2.6 V/($Ag^+$/Ag) or if, under voltammetric conditions, the final potential of scanning is $V_{fin}$=−2.6 V/($Ag^+$/Ag), the potential to which the second surface is brought −2.5 V/($Ag^+$/Ag) is greater than the blockage potential. Thus, the maximal potential of each scan is greater than $V_{bloc}$ on every point of this complex surface. For a number of sufficient voltammetric scans, an electro-grafted film is obtained on the two surfaces of identical thicknesses. The film obtained has a uniform thickness of approximately 90 nanometers for 10 scans over all of the surface.

The values of $V_g$ and $V_{bloc}$ are difficult to indicate with great precision for a generalization. In fact, for $V_g$ it is the value at which one is capable of demonstrating an electro-grafted film: this estimation can vary also as a function of the means of analyzing the surface used to obtain this detection, because the sensitivity of an infrared reflection-absorption spectroscopy apparatus, for example, is not the same as that of a photoelectron X spectroscopy apparatus.

As indicated in the exemplary embodiments below, the error levels are associated with the thicknesses according to the measurement method utilized; for example, by profilometry or ellipsometry, which combined with the allowed tolerance regarding the notion of "uniformity of thickness" can lead to a certain inaccuracy relative to the value of the saturation potential $V_{bloc}$. It must be noted that the imprecision is not intrinsic to the procedure but at the discretion of the operator regarding the fineness of his control.

The person skilled in the art will know how easily to adapt the process of the present invention by following the indications provided in this description for obtaining a uniform film thickness over the entire surface.

The present inventors have also shown that the electro-initiated reactions according to the method of the invention are also reactions having a threshold of imprecision of potential trigger. They have diligently taken part of this observation to obtain, over two distant zones, organic depositions of different thicknesses simultaneously controlled by electrically connecting these two zones in series using a carefully chosen impedance. For example, two gold spots can be produced on a single wafer by a 100 kΩ electrical resistor. By using, under the aforementioned voltammetric conditions, a stoppage potential of $V_{fin}$=2.30 V/($Ag^+$/Ag), the surface connected to the potentiostat "will be" a potential of −2.30 V/($Ag^+$/Ag), whilst the surface linked to the former will be only a potential of −2.20 V/($Ag^+$/Ag): according to FIG. 5, it will be seen that a film producing a transmittance of 1.5% will be formed on the surface connected to the potentiostat, while the film formed on the surface linked to the first via the resistor will have a thickness of 0.9%.

In contrast, when one intends to obtain two thicknesses produced at two different places, the stoppage potential is chosen as being that giving the greatest of the two thicknesses (FIG. 5), and the data of FIG. 5 make it possible to determine the potential that should "see" the zone on which the second thickness is to be deposited. Knowing the electrical current connected to the electro-grafting reaction, the impedance that must be incorporated between the two zones of the surface, upon which the different thicknesses are desired, can thus be determined.

BRIEF DESCRIPTION OF THE FIGURES

The FIGS. 1a) and b) are a diagrammatic illustration of the electrochemical reactions in play in the method of the present invention when the monomer precursor of the organic polymer is acrylonitrile.

In the figures: "S" represents the surface; "Vp" represents the peak potential; "$V_g$" representing the threshold potential from which the electro-grafting appears on the surface; "VS" is the threshold potential on—beyond which there is no current on the surface; "Vi" is the initial scanning potential; "B" indicates the scanning on potential; "Vb" indicates Vbloc, a blockage potential of blockage; "Vf" indicates the final potential of blockage; "Vf" indicates the final surface potential of scanning on surface scanning potential; "C" the current in MA; "I" the intensity in μA; "e" the thickness in nm; "Tr" the transmission in %; "N" the number of cycles or potential scan number; "NO" the wave number of in $cm^{-1}$.

EXAMPLES

Example 1

Critical Potential Qualification Methacrylonitrile Electro-Grafting on Gold

Glass plates, such as microscope slides, coated with a gold deposit obtained by evaporation on a chromium underlayer are used as working electrodes. A standard three-electrode assembly is used, with a silver electrode used as the reference electrode.

The three electrodes are immersed in a 2.5 mol/l methacrylonitrile solution in dimethyl formamide (DMF) in the presence of $10^{-2}$ mol/l of tetraethyl ammonium perchlorate (TEAP). Using a potentiostat, a linear 100 mV/s potential sweep from a potential $V_i=-0.6$ V/(Ag$^+$/Ag) to a potential $V_{fin}$ and back is applied to the working electrodes.

Figure 1A:
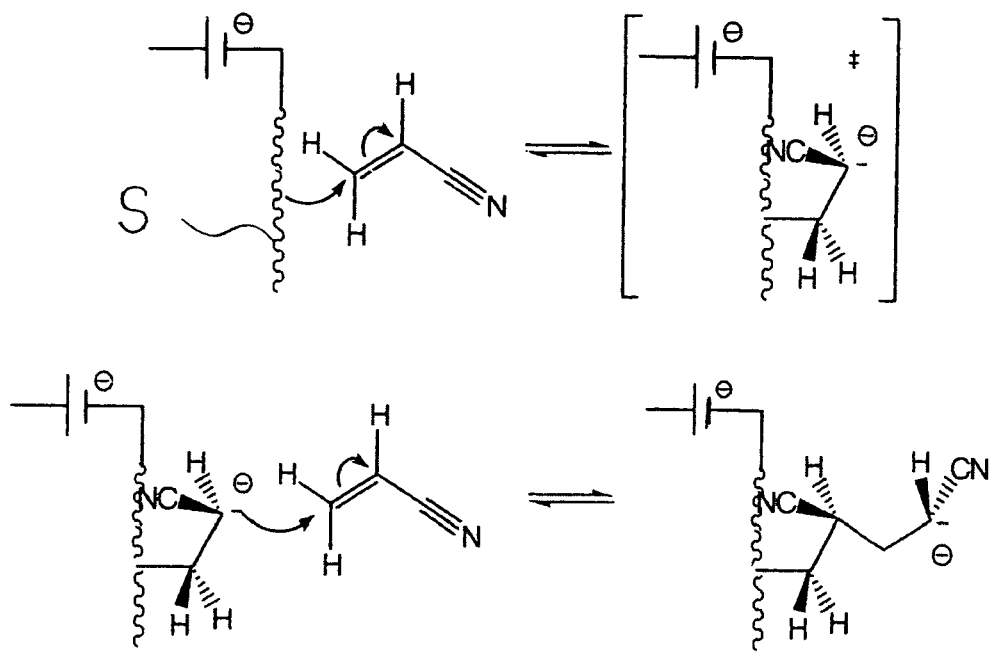
Figure 1B:
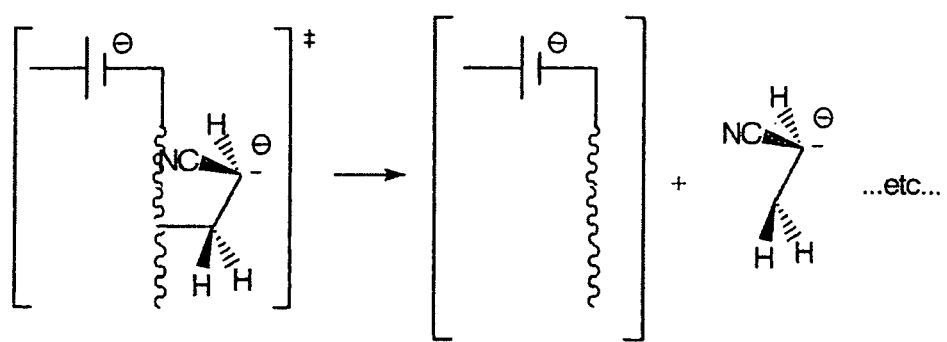
Figure 2:
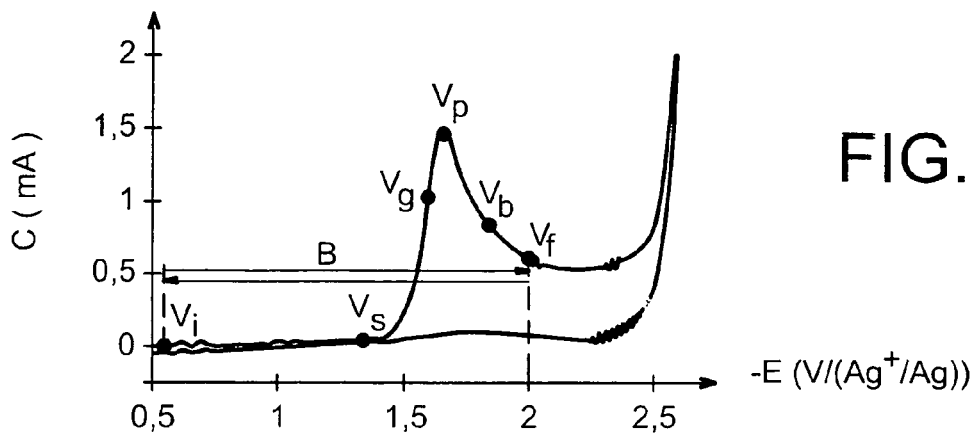
FIG. 2 is a typical voltammogram accompanying an electro-grafting reaction of an activated vinyl monomer. The potentials are to be taken into account in absolute values; they are in fact negative for a cathodic polarization and positive for an anodic polarization.
Figure 3:
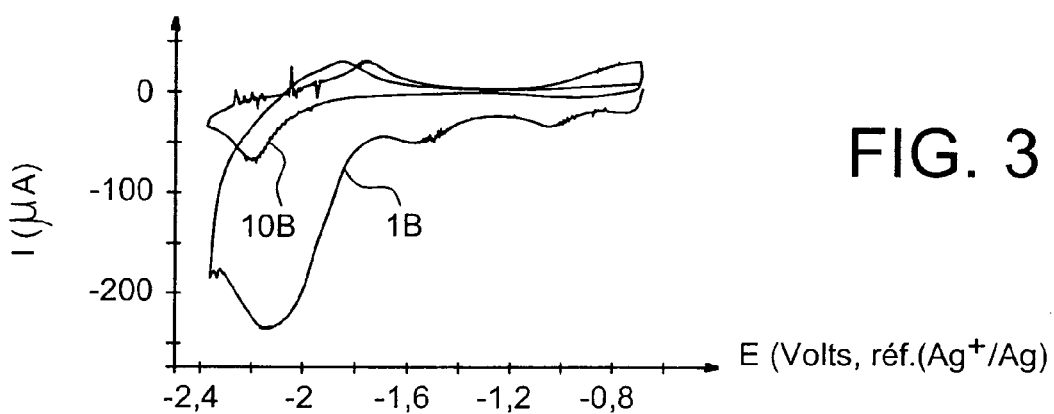
FIG. 3 represents the voltammograms obtained on gold at 100 mV/s of the first and tenth scan of a solution of 2.5 mol/l f methacrylonitrile in DMF in the presence of TEAP.

FIG. 3 appended shows the voltammogram of the first sweep 1B on which the system moves, and that of the tenth sweep 10B.

Each plate, used as a working electrode, is subjected to, for a given potential $V_{fin}$, a number of potential sweeps between $V_i$ and $V_{fin}$. The plate is removed, rinsed with DMF and dried. The thickness of the electro-grafted film obtained is then measured by means of its infrared reflection spectrum (IRRAS), using the scale represented in FIG. 4 appended.

The same work is carried out on several series of plates obtained with stopping potentials $V_{fin}$ of −2.10; −2.15; −2.20; −2.25; −2.30; −2.35 and −2.40 V/(Ag$^+$/Ag).

Figure 5:
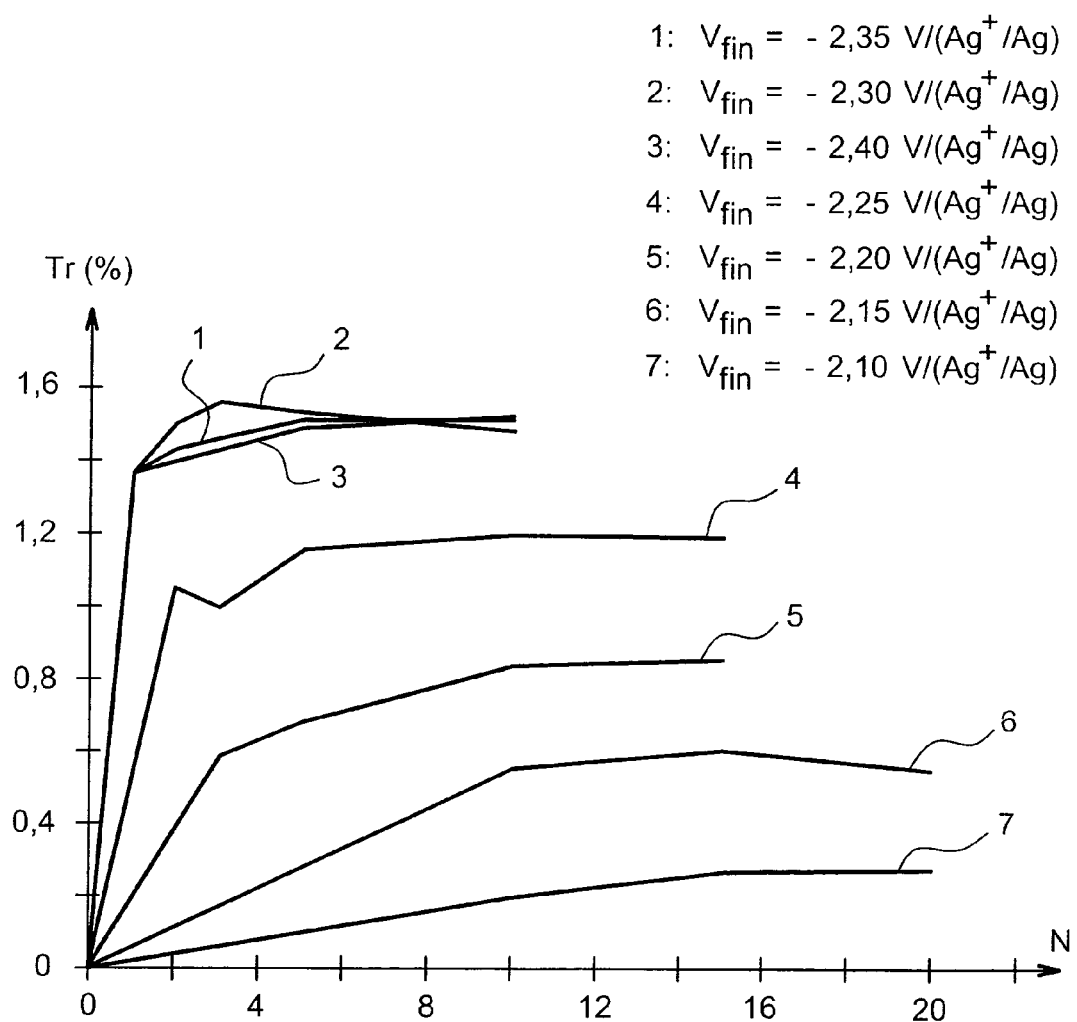
FIG. 5 is a diagrammatic representation of the thickness of the polymethacrylonitrile (PMAN) film electro-grafted onto gold and voltammetric conditions as a factor of the number of scans, for different values of stoppage potential.

The curve giving the thickness of the films obtained on the various plates as a function of the number of sweeps for these different stopping potentials or maximum sweep potentials, is given in FIG. 5 appended.

Figure 6:
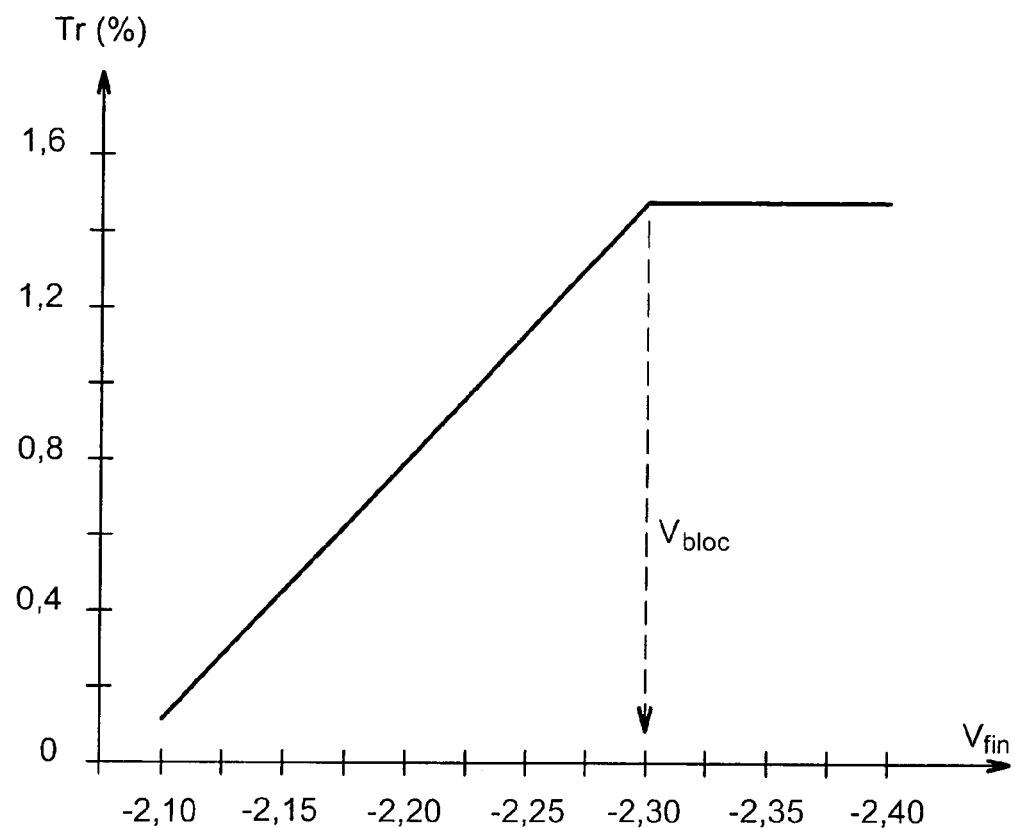
FIG. 6: is a diagrammatical representation of the thickness of the film of polymethacrylonitrile (PMAN) (evaluated via the transmittance of the nitrile label in IRRAS) the electro-grafted on gold under voltammetric conditions as a function of the stoppage potential $V_{fin}$ utilized in a operational protocol under voltammetric conditions. The transmittances utilised are those of the asymptotes observed in the protocol of FIG. 5.
Figure 7:
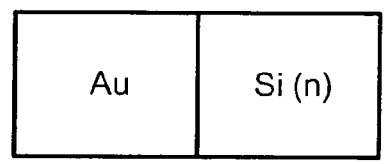
FIG. 7: is a diagrammatic representation viewed from aboe the blades used: If epitaxy then doped n on an SOI substrate, then a sub-layer of titanium/nickel on the moiety of the lame, and finally deposited in gold under vacuum on the adhesion sub-layer.

It is observed that the curves all coincide for $V_{fin}$ (−2.30 V/(Ag$^+$/Ag) which thus corresponds to the saturation or blocking potential within the scope of the thickness measurements made (see FIG. 6). This potential value corresponds to $V_{bloc}$ within the scope of the present invention for this organic polymer film.

It is also observed that for a stopping potential greater than the saturation potential, the thickness reproducibility is of very good quality, since the variation observed is of the order of 5 to 10 nm in this instance.

This example demonstrates that a homogeneous film thickness can be obtained by means of the method according to the present invention using the potential $V_{bloc}$ determined on the graph in FIG. 5 appended as the maximum potential of each sweep.

Example 2

Obtaining Electro-Grafted Films of Similar Thicknesses on Two Terminals Via a Null and Non-Null Impedance, Respectively The purpose of this example is to demonstrate that it is possible to check the thickness of an electro-grafted film despite the presence of an ohmic drop between the potentiostat and the conductive surface on which the electro-grafting takes place.

The surfaces selected to illustrate this example are composite plates obtained from an SOI (SiO$_2$) substrate on which silicon is deposited by means of epitaxy, followed by ionic doping n, and gold deposition, in a vacuum, over half of the plate, having previously deposited a titanium/nickel adhesion underlayer of a few nanometres.

The samples obtained are represented schematically in FIG. 6 appended. They consist of complex surfaces within the scope of the present invention.

These samples are used as working electrodes in a three-electrode electrochemical cell.

Synthesis is carried out according to the following protocol:

Solution: Methacrylonitrile (40%) in DMF, in the presence of $5.10^{-2}$ M of tetraethyl-ammonium perchlorate (TEAP);

Cell: Teflon, without separate compartments, volume 13 ml;

Counter-electrode: 10.4 cm$^2$ Pt sheet;

Reference electrode: Ag/AgClO$_4$;

Working electrode surface area: 6.6 cm$^2$;

Electrochemistry: N cycles, voltammetric conditions: 100 mV/s: $V_{on}=-0.6$ V/(Ag$^+$/Ag) to $V_{fin}$ (variable). The entire plate is immersed in the synthesis medium. The electrical contact (crocodile clip) is carried out either on gold or on silicon;

Electrode rinsing: 15 minutes in ultrasound in acetone +15 minutes in ultrasound in water.

Three additional tests were carried out:

(i) the electrical contact of the working electrode is taken on the gold terminal. The plate is treated with voltammetric sweeps, up to a stopping potential of −2.4 V/(Ag$^+$/Ag);

(ii) the electrical contact of the working electrode is taken on the silicon terminal. The plate is treated with voltammetric sweeps, up to a stopping potential of −2.4 V/(Ag$^+$/Ag);

(iii) the electrical contact of the working electrode is taken on the silicon terminal. The plate is treated with voltammetric sweeps, up to a stopping potential of −2.6 V/(Ag$^+$/Ag).

Figure 4:
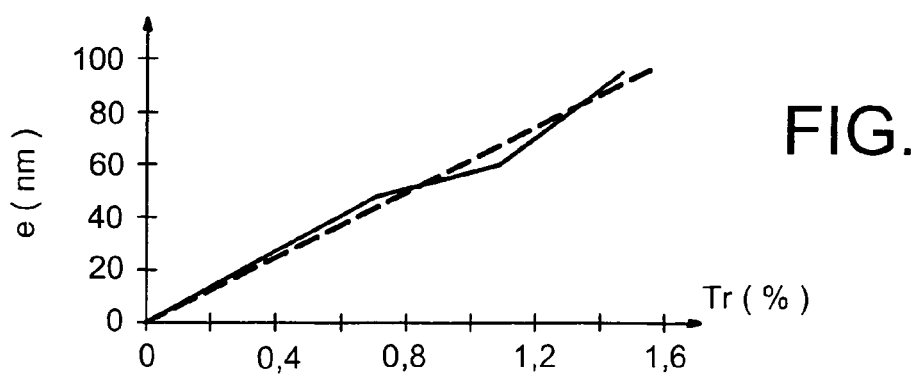
FIG. 4 is a plotting showing the thickness of the polymethacrylonitrile (PMAN), measured by profilometry as a function of the transmittance of the band of the nitrile group (Tr (%)) of the PMAN at 2,200 $cm^{-1}$ obtained by IRRAS.

The thicknesses in (nm) of the polymethacrylonitrile coatings obtained on the gold are measured by means of profilometry, as a function of the transmittance (in %) of the band of nitrile groups of PMAN at 2200 cm$^{-1}$ obtained by IRRAS. The results are represented in FIG. 4 appended.

Table 1 below summarises the operating conditions and thicknesses of the polyacrylonitrile coatings obtained on the gold terminal of samples of the type represented in FIG. 6 according to whether the electrical contact (crocodile clip) is taken on the gold terminal i or on the silicon terminal ii and iii.

TABLE 1

| Experiment | N | $V_{fin}$ (V/(Ag$^+$/Ag)) | Thickness (nm) |
|---|---|---|---|
| (i) | 50 | −2.4 | 48 (5 |
| (ii) | 50 | −2.4 | 10 (5 |
| (iii) | 50 | −2.6 | 38 (5 |

Under the selected operating conditions, the blocking potential $V_{bloc}$ is substantially the same as that in example 1.

The conditions in experiments i and ii are such that the stopping potential is similar to the blocking potential, but in experiment ii, there is an ohmic drop between the potentiostat terminal and the gold terminal, to the extent that the potential actually "experienced" by the gold terminal is less than the blocking potential: the thickness of the polymethacrylonitrile film is substantially less than that obtained in experiment i.

In experiment iii, experiment ii is reproduced, but this time by applying a more cathodic stopping potential than the blocking potential, it is observed that a thickness comparable to that obtained in experiment i is achieved on the gold terminal.

Therefore, the potential drop caused by the silicon terminal, which was not measured, can be estimated at approximately 200 mV.

The results demonstrate that it is indeed the value of the working electrode potential that, for a sufficient number of voltammetric sweeps, makes it possible to check the thickness of the electro-grafted film.

In addition, the films obtained are of a homogeneous thickness on each surface according to the present invention, is greater than $V_{bloc}$ at all points of the surface, i.e., in view of the abovementioned (ohmic) potential drop, when the potential in case ii on the electrical contact is, in absolute values, greater than or equal to $V_{bloc}$+200 mV. Indeed, the potential on the gold terminal is then greater than or equal to $V_{bloc}$, which ensures a uniform film thickness on this complex surface within the scope of the present invention.

Example 3

Qualification of $V_{BLOC}$ Potential for 4-Vinyl Pyridine Electro-Grafting on Gold Glass plates coated with gold as described in example No. 1 are used as working electrodes.

A standard three-electrode assembly is used, with a silver electrode used as the reference electrode. The three electrodes are immersed in a 30% 4-vinyl pyridine solution distilled in commercial DMF in the presence 5.10$^{-2}$ mol/l tetramethyl ammonium perchlorate (TMAP).

Using a potentiostat, 20 cycles of a linear 100 mV/s potential sweep from an initial potential $V_i$ equal to the equilibrium potential $V_{fin}$ and back is applied to the working electrodes. This number of cycles was chosen by the inventors because it corresponds to the minimal number of cycles, for this monomer and under these operating conditions, which makes it possible to achieve the asymptote of the curve giving the thickness as a function of the number of cycles under voltammetric conditions.

Four potentials $V_{fin}$ are taken into consideration: −2.4, −2.5, −2.6 and −2.7 V/(Ag$^+$/Ag). Under operating conditions, the peak potential is equal to −2.4 V/(Ag$^+$/Ag).

Figure 8:
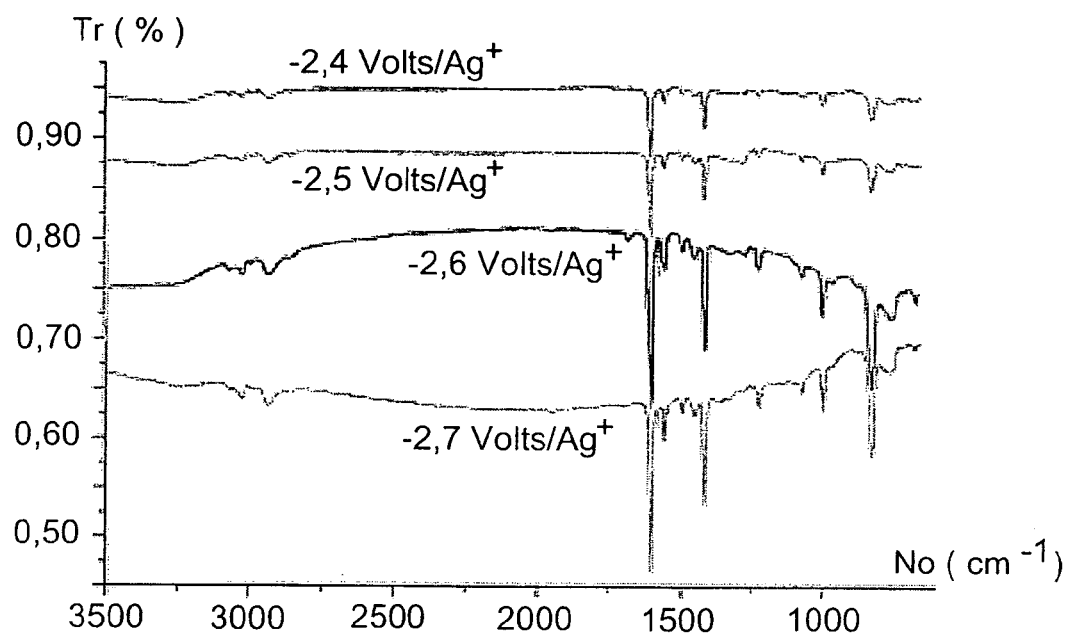
FIG. 8: is an IRRAS spectrum of the Poly 4-vinyl pyrridine (P4VP) obtained by electro-grafting on gold, for different stoppage potentials $V_{fin}$.

Each plate is removed, rinsed with DMF and dried in a nitrogen stream. The thickness of the electro-grafted film obtained is then measured by means of its IRRAS infrared reflection spectrum represented in FIG. 8 appended, using a suitable scale. These thicknesses are also measured independently by means of profilometry, and it is observed that the results of both types of measurements are consistent.

Figure 9:
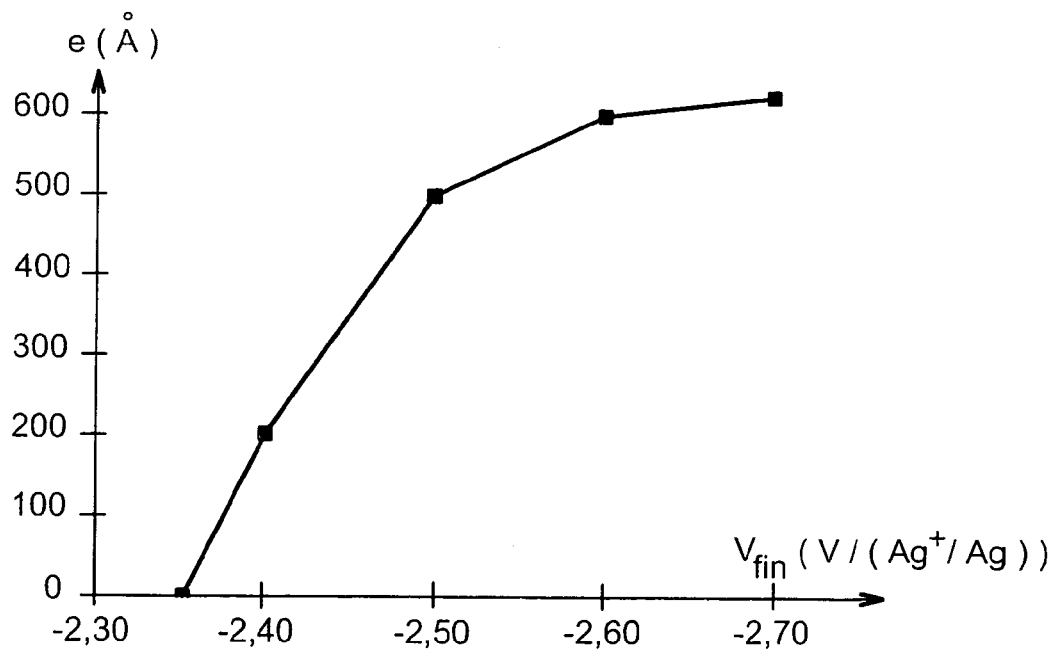
FIG. 9: is a graphic representation of the variation of thickness measured by profilometry of P4VP films obtained by 20 voltammetric scans between the potential of equilibrium and different stoppage potential $V_{fin}$.

The curve giving the thickness of the films obtained on the various plates as a function of the number of sweeps for these different stopping potentials is given in FIG. 9 appended.

A thickness asymptote is observed for $V_{fin}$ (−2.60 V/(Ag$^+$/Ag), which thus corresponds to the saturation potential $V_{bloc}$ for 4-vinyl pyridine on gold within the scope of the measurements made. It is observed that for a stopping potential greater than the saturation potential, the thickness reproducibility is of very good quality, since the variation observed is of the order of 5 to 10 nm.

Example 4

Qualification of $V_{BLOC}$ Potential for Butyl Methacrylate (BuMA) Electro-Grafting on Gold Glass plates coated with gold as described in example No. 1 are used as working electrodes.

A standard three-electrode assembly is used, with a silver electrode used as the reference electrode. The three electrodes are immersed in a 30% butyl methacrylate (BuMA) solution in commercial DMF in the presence of 5.10$^{-2}$ mol/l tetramethyl ammonium perchlorate (TMAP).

Using a potentiostat, 20 cycles of a linear 100 mV/s potential sweep from an initial potential Vi equal to the equilibrium potential $V_{fin}$ and back are applied to the working electrodes. This number of cycles was chosen by the inventors because it corresponds to the minimal number of cycles, for this monomer and under these operating conditions, which makes it possible to achieve the asymptote of the curve giving the thickness as a function of the number of cycles under voltammetric conditions.

Four potentials $V_{fin}$ are taken into consideration: −2.4, −2.7, and −2.9 V/(Ag$^+$/Ag). Under operating conditions, the peak potential is equal to −2.73 V/(Ag$^+$/Ag).

Figure 10:
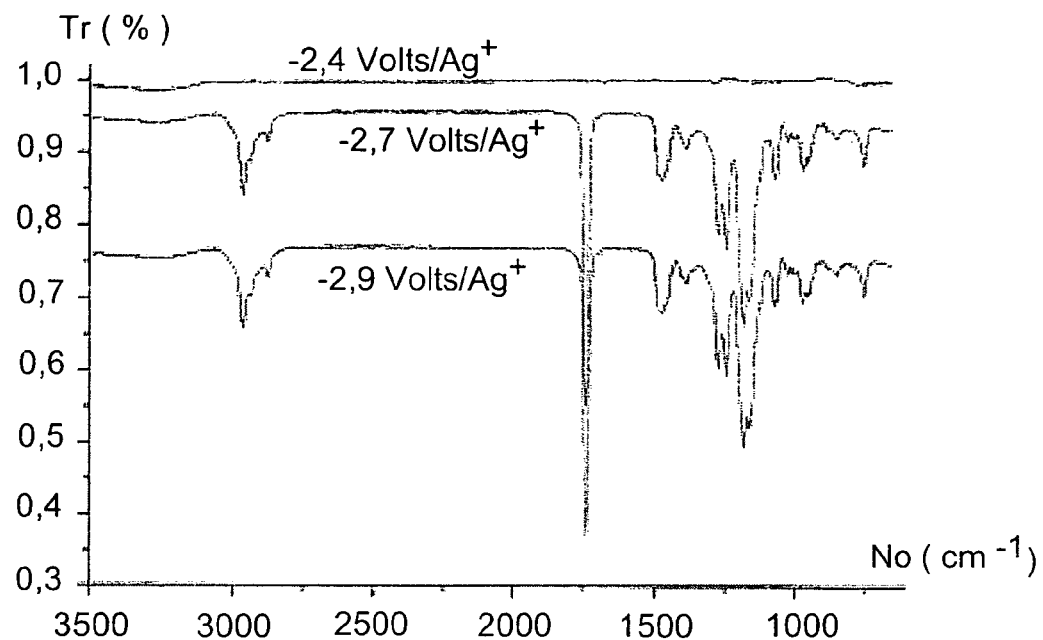
FIG. 10: is an IRRAS spectrum of the Poly 4-vinyl pyrridine (P4VP) obtained by electro-grafting on gold, for different stoppage potentials $V_{fin}$.

Each plate is removed, rinsed with DMF and dried in a nitrogen stream. The thickness of the electro-grafted film obtained is then measured by means of its IRRAS infrared reflection spectrum represented in FIG. 10 appended, using a suitable scale. These thicknesses are also measured independently by means of profilometry, and it is observed that the results of both types of measurements are consistent.

Figure 11:
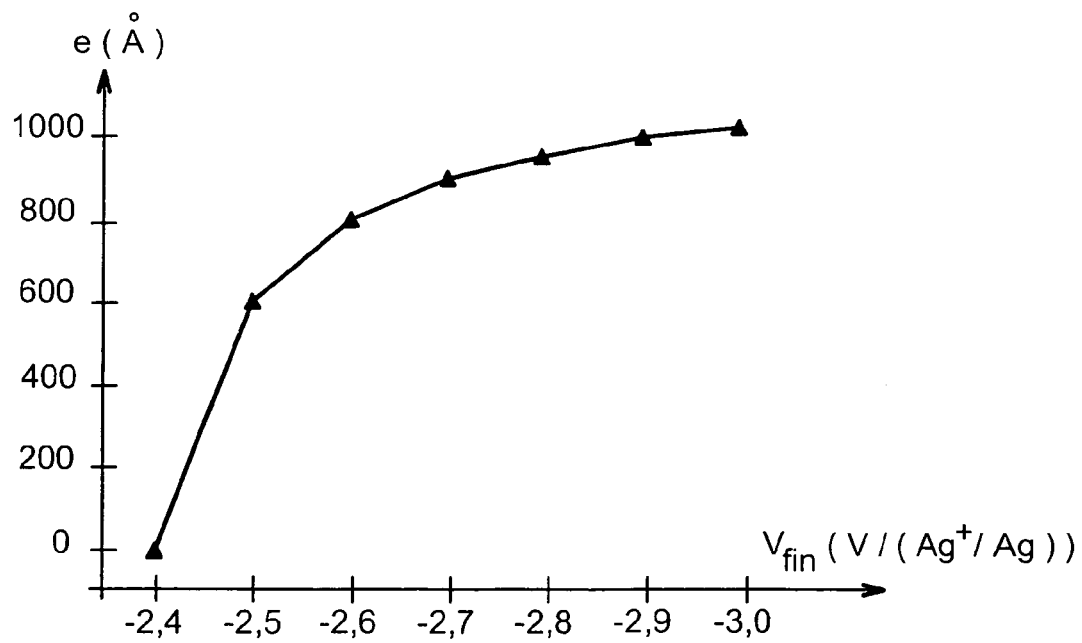
FIG. 11: is a graphic representation of the variation of thickness measured by profilometry of PBUMA films obtained by 20 voltammetric scans between the potential of equilibrium and different stoppage potential $V_{fin}$.

The curve giving the thickness of the films obtained on the various plates as a function of the number of sweeps for these different stopping potentials is given in FIG. 11.

A thickness asymptote is observed for $V_{fin}$ (−2.60 V/(Ag$^+$/Ag), which thus corresponds to the saturation potential $V_{bloc}$ for 4-vinyl pyridine on gold within the scope of the measurements made according to the method of the present invention. It is observed that for a stopping potential greater than the saturation potential, the thickness reproducibility is of very good quality, since the variation observed is of the order of 5 to 10 nm.

The invention claimed is:

1. Method for cladding a simple or complex surface, electrically conducting or semiconducting, by means of an organic film from at least one precursor of said organic film, characterised in that the cladding of the surface by the organic film is carried out by electro-initiated grafting of said, at least one, precursor of said surface by applying at least one potential sweep on this surface carried out in such a way that at any point of said surface the maximum potential of each potential sweep, in absolute value and relative to a reference electrode, is greater than or equal to the value of the potential ($V_{bloc}$) from which the curves of a graph expressing the quantity of electro-grafted precursor on a surface identical to said surface in function of the number of potential sweeps are all superposed and independent of this $V_{bloc}$ potential.

2. Method according to claim 1, wherein the organic film is an organic polymer film and the precursor is an electro-active monomer precursor of said organic polymer film.

3. Method according to claim 2, wherein the monomer precursor of the organic polymer is a vinylic monomer or a mixture of vinylic monomers.

4. Method according to claim 2, wherein the, at least one, monomer precursor of the organic polymer being a vinylic monomer, it is chosen from amongst the group constituted of vinylic monomers such as acrylonitrile, methacrylonitrile, methyl methacrylate, ethyl methacrylate, butyl methacrylate, propyl methacrylate, hydroxyethyl methacrylate, hydroxypropyl methacrylate, glycidyl methacrylate, the acrylamides and in particular the amino-ethyl, propyl, butyl, pentyl and hexyl methacrylamides, the cyanoacrylates, di-methacrylate polyethylene glycol, acrylic acid, methacrylic acid, styrene, parachloro-styrene, N-vinyl pyrrolidine, 4-vinyl pyridine, the vinyl halides, acryloyl chloride, methacryloyl chloride, and their derivatives.

5. Method according to claim 2, wherein the electro-initiated polymerisation consists of electro-grafting of cyclic monomers cleavable by nucleophilic or electrophilic attack.

6. Method according to claim 2, wherein the electro-initiated polymerisation consists of electro-grafting of salts of diazonium, sulfonium, phosphonium or iodonium.

7. Method according to claim 2, wherein the electro-initiated polymerisation is initiated by salts of diazonium, sulfonium, phosphonium or iodonium, in the presence of polymerisable monomers by free radical means such as vinylic monomers or cleavable cyclic molecules.

8. Method according to claim 1, wherein the precursor is a vinylic monomer coupled to a molecule or a macromolecule chosen amongst the group constituted of a polymer such as polyethylene glycol; of a nitrogenous base or a derived nitrogenous base; of an oligonucleotide; of a peptide; of a fatty acid; of a glucide; of a polysaccharide, modified or not; of cellulose and its derivatives and of chitosan and its derivatives.

9. Method according to claim 2, wherein N potential sweeps are applied, N being a whole positive number, with $1 \leq N \leq 15$.

10. Method according to claim 2, wherein the potential sweep is a voltammetric or multi-slot sweep.

11. Method according to claim 2, in which the precursor monomer being methacrylonitrile, $V_{bloc}$ is −2.3 to −2.5 V ($Ag^+/Ag$).

12. Cladding obtained by the method according to claim 1.

13. Utilisation of a method according to claim 1, for the organic functioning of a surface.

14. Utilisation of a method according to claim 1, for the manufacture of a biochip or a sensor.

15. Utilisation of a method according to claim 1 for producing an insulating layer or a barrier layer in a microsystem.

16. Utilisation of a method according to claim 1 to produce an insulating layer or a barrier layer for microelectronics.

* * * * *